June 7, 1932.  A. G. CUSHING  1,861,788
VEHICLE BRAKE
Filed June 28, 1930  2 Sheets-Sheet 2
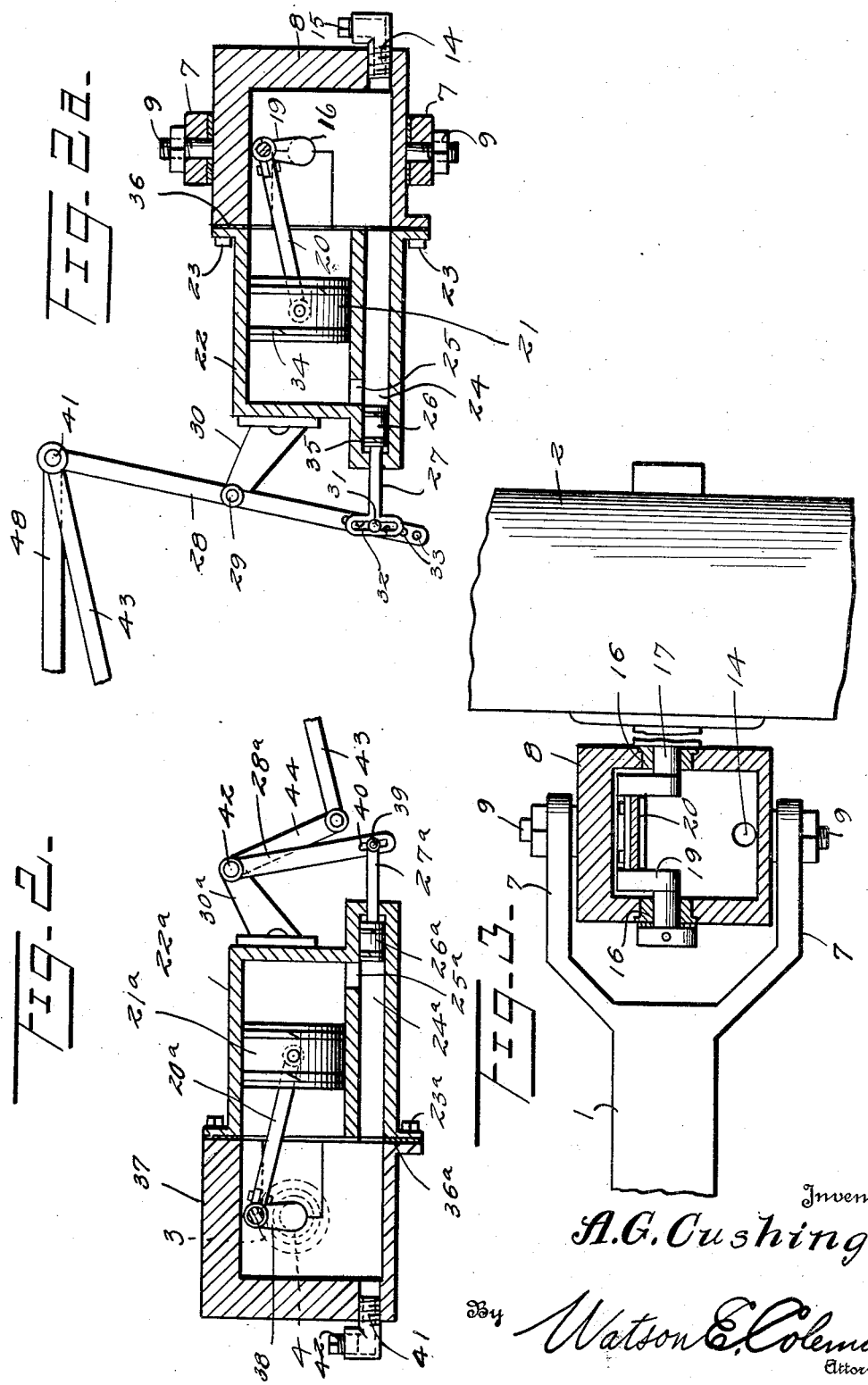
Inventor
A.G.Cushing
By Watson E. Coleman
Attorney Patented June 7, 1932

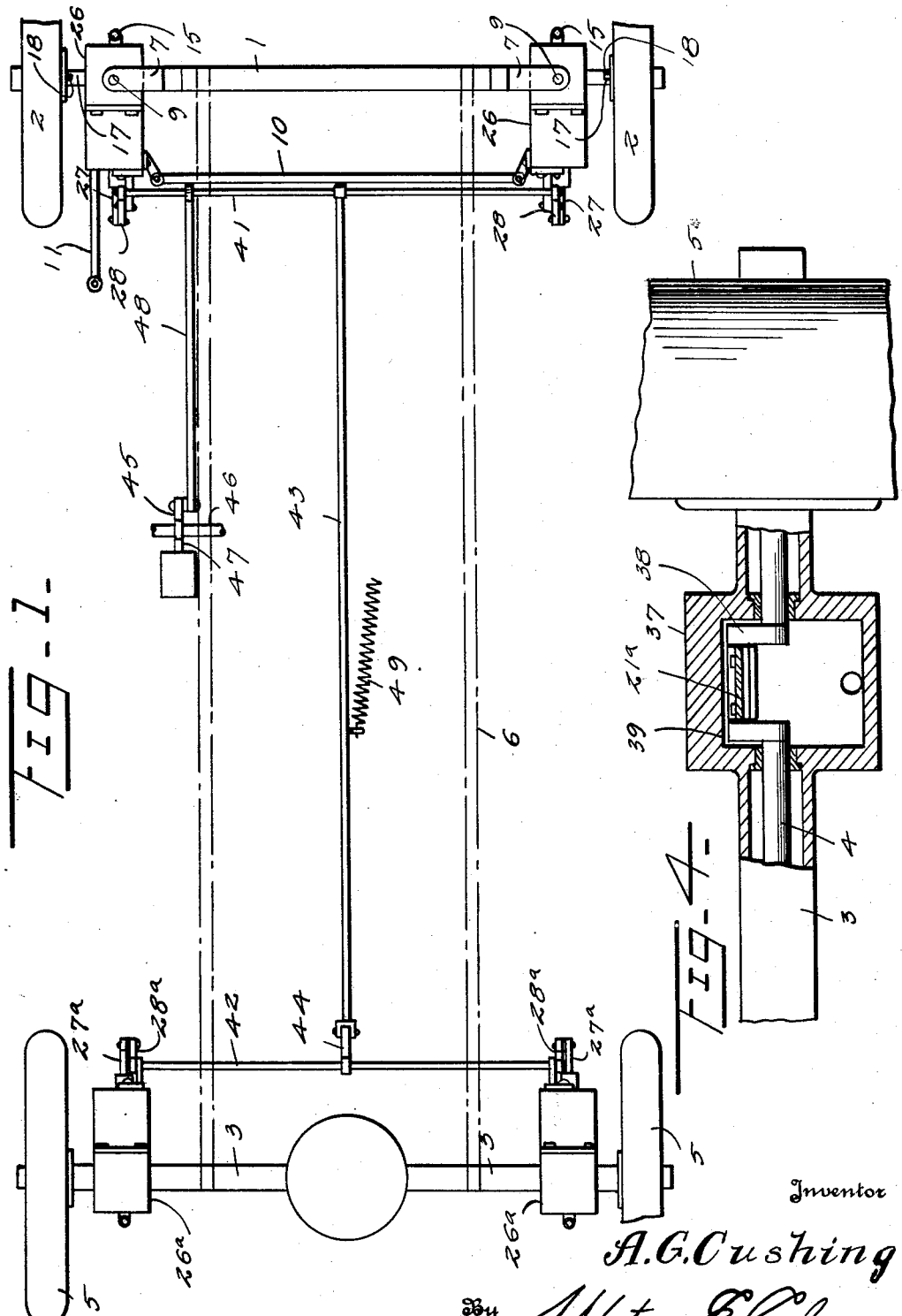

1,861,788

UNITED STATES PATENT OFFICE

ADAM G. CUSHING, OF VANCOUVER, WASHINGTON

VEHICLE BRAKE

Application filed June 28, 1930. Serial No. 464,642.

This invention relates to vehicle brakes, and has for one of its objects to provide a novel brake which shall be especially adapted for automobiles of all types, which shall be adapted when in operation to apply the same braking force to each of the four wheels of an automobile, and which shall be adapted to be easily controlled to effect the application of the required braking force to the wheels.

The invention has for a further object to provide a brake of the character stated which will not be effected by heat, cold or water, which shall comprise comparatively few parts, and which may be maintained in a highly efficient operating condition at comparatively low expense.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a top plan view of the running gear of an automobile equipped with a brake constructed in accordance with my invention;

Figures 2 and 2a are sectional views taken on a vertical plane extending centrally and longitudinally through an alined pair of the front and rear units of the brake;

Figure 3 is a view partly in elevation and partly in vertical section of a portion of the front axle, one of the front wheels and one of the front units of the brake, and Figure 4 is a view partly in elevation and partly in vertical section of a portion of the rear axle housing, one of the rear wheels and one of the rear units of the brake.

Referring in detail to the drawings, 1 designates the front axle, 2 the front or steering wheels, 3 the rear axle housing, 4 the rear axles, 5 the rear or driving wheels, and 6 the chassis of an automobile embodying my improved brake.

The front axle 1 is provided at its ends with forks 7 in which steering knuckles 8 are secured by spindle studs 9. The steering knuckles 8, which are in the form of rectangular casings, are connected by a tie rod 10, and one of them is provided with a steering arm 11 which is adapted to be connected to the steering shaft of the automobile in the usual manner. The casings 8 are open at their rear sides and constitute oil reservoirs 13 which have filling openings 14 closed by removable plugs 15. The casings 8 are provided in their inner and outer or lateral sides with bearings 16 for the reception of secondary axles 17 to which the steering wheels 2 are keyed, as shown at 18. The axles 17 are provided with cranks 19 which are located in the casings 8 and are connected by rods 20 to pistons 21 reciprocable in cylinders 22.

The cylinders 22 extend rearwardly from the casings 8, and are fully open at their front and closed at their rear ends. The cylinders 22, which have their front ends arranged in communication with the rear sides of the casings 8, are secured to the casings by cap screws 23. The cylinders 22 are provided at their lower sides with passages 24 which communicate at their front ends with the casings 8 and communicate at their rear or closed ends by way of ports 25 with the rear ends of the cylinders. The ports 25 are under the control of valves 26 slidably mounted in the rear ends of the passages 24. Stems 27, which are fixed to the valves 26, extend through and beyond the rear ends of the passages 24, and are connected to the lower ends of vertical levers 28 which are pivotally mounted between their ends, as at 29, upon brackets 30 fixed to the rear ends of the cylinders 22. The valve stems 27 are connected to the levers 28 by bolts 31 carried by the levers and passing through vertical loops 32 carried by the valve stems. The levers 28 are provided with a vertical series of openings 33 to permit the bolts 31 to be secured thereto at different distances from the pivots 29, to the end that the movement imparted to the valves 26 by any movement of the levers may be regulated and controlled.

The pistons 21 are provided with packing rings 34, and the valves 26 are provided with packing rings 35. A liquid-tight connection is established between the casings 8 and cylinders 22 by gaskets 36.

The rear axle housing 3 is provided with rectangular casings 37 which are fixedly secured thereto and may be formed integrally therewith. The rear axles 4 extend through the casings 37 and are provided with cranks 38 which rotate within the casings. The casings 37 are open at their front sides and constitute oil reservoirs which have filling openings 41 closed by removable plugs 42. Cylinders 22$^a$, similar to the cylinders 22, extend forwardly from the casings 37 and communicate at their rear ends with the front sides of the casings. The cranks 38 are connected by rods 20$^a$ to the pistons 21$^a$ of the cylinder 22$^a$. The passages 24$^a$ of the cylinders 22$^a$ communicate at their rear ends with the casings 37 and communicate at their front ends by way of ports 25$^a$ with the front or closed ends of the cylinders. The stems 27$^a$ of the valves 26$^a$ of these passages are connected to the lower ends of vertical levers 28$^a$ which are pivoted at their upper ends to brackets 30$^a$ carried by the front ends of the cylinders 22$^a$. The stems 27$^a$ are connected to the levers 28$^a$ by pins 39 carried by the stems and passing through slots 40 in the levers.

The upper ends of the levers 28 are connected by a rod 41, and the upper ends of the levers 28$^a$ are carried by a rod 42. A link 43 is connected to the rod 41 and to an arm 44 extending downwardly from the rod 42. A lever 45 pivoted intermediate its ends, as at 46, is provided at its upper end with a pedal 47, and is connected at its lower end by a link 48 to the rod 41. The pedal 47 is arranged for operation by the driver of the automobile and is so connected to the valves 26 and 26$^a$ that it will, when depressed, move the valves 26 and 26$^a$ in a direction to close the ports 25 and 25$^a$.

A coil spring 49 which is secured at one end to the link 43 and at its opposite end to the chassis 6, is tensioned during the movement of the valves 26 and 26$^a$ in the direction of their closed position. When the pedal 47 is released, the spring 49 reacts to return the valves 26 and 26$^a$ to their opened position and it further functions to normally hold the valve in this position.

From the foregoing description, taken in connection with the accompanying drawings, it should be apparent that the brake comprises four similar units associated respectively with the respective wheels of the automobile, and that each brake unit comprises a cylinder communicating at its ends with an oil reservoir, a wheel operated piston reciprocably mounted in the cylinder, and a valve for controlling the communication between one end of the cylinder and the reservoir. When the automobile is in motion and the valves are opened, the reciprocation of the pistons by the wheels will draw oil into and expel it from the cylinders by way of the ports. The oil passes freely through the uncovered ports to and from the cylinders and will not, therefore, offer any resistance to the reciprocation of the pistons and the rotation of the wheels. When it is desired to bring the automobile to a stop, the pedal is depressed to effect the movement of the valves in the direction of their closed positions. The movement of the valves into fully closed position will cut off all communication between the cylinders and the reservoirs by way of the ports, with the result that the oil entrapped in the cylinders between the closed ends of the cylinders and the pistons will arrest the movement of the pistons in the direction of said ends of the cylinders, and the arresting of the movement of the pistons will apply braking force to the wheels.

The braking force is at maximum when the valves are fully closed, and if it is desired to apply lesser braking force to the wheels, the valves are only partly closed. It will thus be seen that by rapidly moving the valves into closed position, the automobile may be brought to a quick stop, that by slowly moving the valves into closed position, the automobile may be slowly stopped, and that by moving the valves into partly closed position, the speed of the automobile may be reduced without bringing it to a stop. The adjustable connection between the valve stems and their levers permits the operation of the valves to be so timed that the valves of the front wheel braking units will not be moved into closed position until after the valves of the rear wheel braking units have been closed. After the brakes have been applied and the pedal released, the valves will be quickly returned to their normally opened position by the spring. As each cylinder is in communication at both of its ends with its reservoir the entire wall of the cylinder will be lubricated and the means for securing the connecting rod to the piston will also be lubricated.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. In combination, a front axle, casings pivoted to the front axle and constituting liquid reservoirs, secondary axles journaled in the casings and provided with cranks, wheels fixed to the secondary axles, cylinders fixed to the casings and each communicating at both ends with its casing, pistons reciprocable in the cylinders and connected to the cranks, a valve controlling communication between one end of each cylinder and its casing, and valve operating means.

2. In combination, rear axles provided with cranks, housings in which the rear axles are mounted and constituting liquid reservoirs, cylinders fixed to the housings and each communicating at both ends with the housings, pistons reciprocable in the cylinders and connected to the cranks, a valve for controlling communication between one end of each cylinder and its housing, and valve operating means.

3. In combination, a front axle, casings pivoted to the front axle and constituting liquid reservoirs, secondary axles journaled in the casings and provided with cranks, wheels fixed to the secondary axles, cylinders fixed to the casings and each communicating at both ends with its casing, pistons reciprocable in the cylinders and connected to the cranks, a valve controlling communication between one end of each cylinder and its casing, rear axles provided with cranks, housings in which the rear axles are mounted, casings carried by the housing and constituting fluid reservoirs and in which said second cranks are located, cylinders fixed to said second casings and each communicating at both ends with its casing, pistons reciprocable in said second cylinders and connected to said second cranks, a valve for controlling communication between one end of each of said second cylinders and its casing, and valve operating means.

4. In combination, a front axle, steering knuckles pivoted to the axle and provided with liquid reservoirs, secondary axles journaled in the steering knuckles and provided with cranks located in the reservoirs, wheels fixed to the secondary axles, cylinders fixed to the steering knuckles and each communicating at both ends with its reservoir, pistons reciprocably mounted in the cylinders and connected to the cranks, rear axles provided with cranks, a housing in which the axles are journaled provided with reservoirs in which said second cranks are located, cylinders fixed to the housing and each communicating at both ends with each of said second reservoirs, pistons mounted in said second cylinders and connected to said second cranks, and means for controlling communication between one end of each cylinder and its reservoir.

5. In combination, a front axle, steering knuckles pivoted to the axle and provided with liquid reservoirs, secondary axles journaled in the steering knuckles and provided with cranks located in the reservoirs, wheels fixed to the secondary axles, cylinders fixed to the steering knuckles and each communicating at both ends with its reservoir, pistons reciprocably mounted in the cylinders and connected to the cranks, rear axles provided with cranks, a housing in which the axles are journaled provided with reservoirs in which said second cranks are located, cylinders fixed to the housing and each communicating at both ends with its reservoir, pistons mounted in said second cylinders and connected to said second cranks, valves for controlling communication between one end of each cylinder and its reservoir, levers pivoted to the cylinders and adjustably connected to the valves, means connecting the levers, and a pedal lever connected to said means.

6. A liquid pressure brake for vehicle wheels, comprising liquid reservoirs, cylinders each open at one end and closed at the other, the cylinders having their open ends communicating with the reservoirs and provided near their closed ends with ports, the cylinders having passages communicating with said ports and the reservoirs, pistons reciprocable in the cylinders, means adapted to connect the pistons to the vehicle wheels, normally opened valves for said ports, and means for controlling the valves and operable to first close certain of the valves and to thereafter close the others.

In testimony whereof I hereunto affix my signature.

ADAM G. CUSHING.